(12) United States Patent
Szarski et al.

(10) Patent No.: US 9,937,625 B2
(45) Date of Patent: Apr. 10, 2018

(54) SELF-LOCATING ROBOTS

(71) Applicant: The Boeing Company, Chicago, IL (US)

(72) Inventors: Martin Alexander Szarski, Canterbury (AU); David Michael Bain, Ashburton (AU); Phillip John Crothers, Hampton East (AU)

(73) Assignee: THE BOEING COMPANY, Chicago, IL (US)

( * ) Notice: Subject to any disclaimer, the term of this patent is extended or adjusted under 35 U.S.C. 154(b) by 68 days.

(21) Appl. No.: 14/982,695

(22) Filed: Dec. 29, 2015

(65) Prior Publication Data
US 2017/0182666 A1   Jun. 29, 2017

(51) Int. Cl.
*B25J 13/08* (2006.01)
*B25J 19/02* (2006.01)
(Continued)

(52) U.S. Cl.
CPC .............. *B25J 13/089* (2013.01); *B25J 5/007* (2013.01); *B25J 9/046* (2013.01); *B25J 9/1664* (2013.01);
(Continued)

(58) Field of Classification Search
CPC ........ B25J 13/089; B25J 9/1664; B25J 5/007; B25J 9/046; B25J 19/021; B25J 19/023;
(Continued)

(56) References Cited

U.S. PATENT DOCUMENTS 4,885,836 A * 12/1989 Bonomi ................... B21J 15/10
227/51
5,999,866 A   12/1999 Kelly et al.
(Continued)

FOREIGN PATENT DOCUMENTS

DE     102011115354 A1   4/2013
EP        2939795 A2   11/2015
(Continued)

OTHER PUBLICATIONS

Skaggs et al., "Method and Device for Performing Automated Operations on a Workpiece," U.S. Appl. No. 14/801,312, filed Jul. 16, 2015, 29 pages.
(Continued)

*Primary Examiner* — Jaime Figueroa
(74) *Attorney, Agent, or Firm* — Yee & Associates, P.C.

(57) ABSTRACT

A method and apparatus for a robot self-locating on a movement surface. The method may comprise moving a first robot across the movement surface and relative to a workpiece, in which the movement surface faces the workpiece. The method may also form sensor data using a first number of sensors on the first robot as the first robot moves across the movement surface, in which the sensor data represents identifying characteristics of a portion of the movement surface. The method may also determine a location of the first robot on the movement surface using the sensor data. The method may further determine a location of a functional component of the first robot relative to the workpiece using the location of the first robot on the movement surface.

25 Claims, 11 Drawing Sheets

(51) Int. Cl.
  *B25J 9/16* (2006.01)
  *B25J 9/04* (2006.01)
  *B25J 15/00* (2006.01)
  *B25J 5/00* (2006.01)

(52) U.S. Cl.
  CPC .......... *B25J 9/1697* (2013.01); *B25J 19/021* (2013.01); *B25J 19/023* (2013.01); *G05B 2219/37208* (2013.01); *G05B 2219/37558* (2013.01); *G05B 2219/40424* (2013.01)

(58) Field of Classification Search
  CPC ...... B25J 9/1697; B25J 9/1669; B25J 9/1612; B25J 9/1687; B25J 9/0084; B25J 9/1682; B25J 9/0093; B25J 9/0096; B25J 9/0087; B25J 11/0005; B25J 13/0006; G05B 2219/40424; G05B 2219/37208; G05B 2219/37558; B64F 5/00; B64F 5/10; B66C 5/02; B66C 19/005; Y10S 901/08
  USPC .................................................. 700/245, 253
  See application file for complete search history.

(56) References Cited

U.S. PATENT DOCUMENTS

| | | | | |
|---|---|---|---|---|
| 7,507,059 | B2* | 3/2009 | Hamann | B23Q 1/766 29/34 B |
| 7,682,112 | B2* | 3/2010 | Panczuk | B23Q 1/01 409/132 |
| 8,301,302 | B2* | 10/2012 | Sarh | B25J 9/1682 29/33 R |
| 8,925,185 | B2* | 1/2015 | Sarh | B25J 5/00 29/34 B |
| 2004/0143951 | A1* | 7/2004 | Berninger | B23K 37/0435 29/428 |
| 2008/0006653 | A1* | 1/2008 | Dai | B01L 3/0268 222/75 |
| 2009/0012647 | A1* | 1/2009 | Kamiya | B25J 9/1669 700/248 |
| 2011/0245971 | A1* | 10/2011 | Sarh | B25J 9/1682 700/248 |
| 2012/0011693 | A1* | 1/2012 | Amirehteshami | B23P 21/002 29/428 |
| 2012/0116585 | A1* | 5/2012 | Yoshima | B23K 9/1062 700/248 |
| 2013/0247829 | A1* | 9/2013 | Taneja | A01K 5/0114 119/51.11 |
| 2016/0016311 | A1* | 1/2016 | Konolige | B25J 5/007 700/245 |

FOREIGN PATENT DOCUMENTS

| | | |
|---|---|---|
| EP | 2939799 A2 | 11/2015 |
| WO | WO0171441 A1 | 9/2001 |
| WO | WO2009086495 A2 | 7/2009 |

OTHER PUBLICATIONS

Skaggs et al., "Method and System for Controlling Automated Operations on a Workpiece," U.S. Appl. No. 14/801,396, filed Jul. 16, 2015, 32 pages.

Crothers, "Substantially Simultaneous Manufacturing Functions," U.S. Appl. No. 14/630,945, filed Feb. 25, 2015, 83 pages.

Extended European Search Report, dated Jul. 3, 2017, regarding Application No. 16195799.8, 10 pages.

* cited by examiner

SELF-LOCATING ROBOTS

BACKGROUND INFORMATION

1. Field

The present disclosure generally relates to manufacturing and, in particular, to performing functions on a workpiece using robots. Still more particularly, the present disclosure relates to a method and apparatus for a robot self-locating on a movement surface to perform functions on a workpiece.

2. Background

In manufacturing, robots may perform functions on a workpiece. Some robots may be articulated arm robots tethered to the manufacturing floor. Some other robots may travel along a surface using a movement system. When a robot travels using a movement system, the robot may keep track of its location. Functions may be desirably performed within engineering tolerances on desired locations on a workpiece. Knowledge of a robot's location may be important for controlling a location of function on a workpiece.

When a robot travels over the workpiece, the location of the robot may be determined by markings placed on the workpiece. For example, the robot may sense a guidance path on the workpiece. Further, the robot may perform functions based on target indicators. Target indicators may indicate locations where the robot may desirably perform a function.

Some robots may travel along a movement surface separate from the workpiece. The movement surface may be moved relative to the workpiece. As a result, a movement surface may not have a guidance path or target indicators.

A location of the robot traveling along a movement surface may be initially determined using any desirable method. The robot may then estimate future locations through odometry. Odometry may include motion sensors to estimate the change of the robot's location over time. However, odometry may introduce inaccuracies into the estimated location. Inaccuracies due to odometry may compound over time. The inaccuracies may cause the functions to be performed on the workpiece outside the tolerance of the desired locations. Therefore, it would be desirable to have a method and apparatus that take into account at least some of the issues discussed above, as well as other possible issues.

SUMMARY

An illustrative embodiment of the present disclosure provides a method of a robot self-locating on a movement surface. The method may comprise moving a first robot across the movement surface and relative to a workpiece, in which the movement surface faces the workpiece. The method may also form sensor data using a first number of sensors on the first robot as the first robot moves across the movement surface, in which the sensor data represents identifying characteristics of a portion of the movement surface. The method may also determine a location of the first robot on the movement surface using the sensor data. The method may further determine a location of a functional component of the first robot relative to the workpiece using the location of the first robot on the movement surface.

Another illustrative embodiment of the present disclosure provides a method of a robot self-locating on a movement surface. The method may comprise scanning the movement surface with a first number of sensors to form surface data. The method may further move a first robot across the movement surface and relative to a workpiece, in which the first robot is positioned between the movement surface and the workpiece. The method may also determine a location of the first robot on the movement surface at regular time intervals as the first robot moves across the movement surface. Determining the location of the first robot may comprise forming sensor data using a first number of sensors on the first robot as the first robot moves across the movement surface, in which the sensor data represents identifying characteristics of a portion of the movement surface. Determining the location of the first robot may further comprise comparing the sensor data to the surface data to form a comparison, and determining the location of the first robot on the movement surface using the comparison. The method may also determine a location of a functional component of the first robot relative to the workpiece using the location of the first robot on the movement surface, in which the functional component is on an opposite side of the first robot from the first number of sensors on the first robot.

A further illustrative embodiment of the present disclosure provides an apparatus. The apparatus may comprise a movement surface with identifying characteristics, a first robot associated with the movement surface, and a number of sensors. The number of sensors may be associated with the first robot and facing the movement surface.

Yet another illustrative embodiment of the present disclosure provides an apparatus. The apparatus may comprise a workpiece, a movement surface with identifying characteristics across all of the movement surface, a processor, a first robot, and a first number of sensors. The movement surface may face the workpiece. The processor may have surface data representing the identifying characteristics of the movement surface. The first robot may be associated with the movement surface and positioned between the movement surface and the workpiece. The first number of sensors may be associated with the first robot and may face the movement surface. The first number of sensors may be configured to form sensor data as the first robot moves across the movement surface. The sensor data may represent the identifying characteristics of a portion of the movement surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
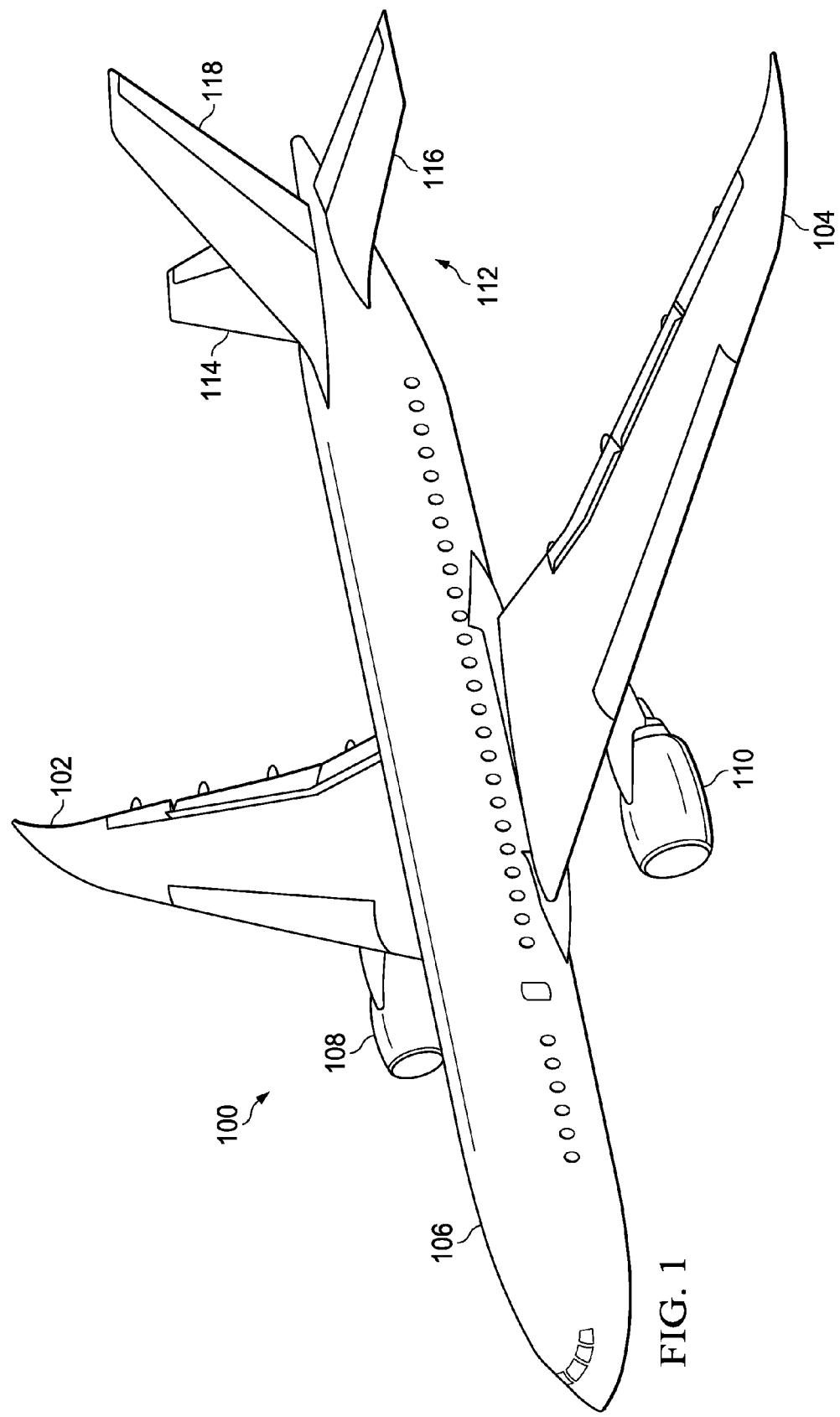
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components which may be manufactured in accordance with an illustrative embodiment. For example, robots performing manufacturing or maintenance of at least one of wing 102, wing 104, or body 106 of aircraft 100 may self-locate.

Figure 12:
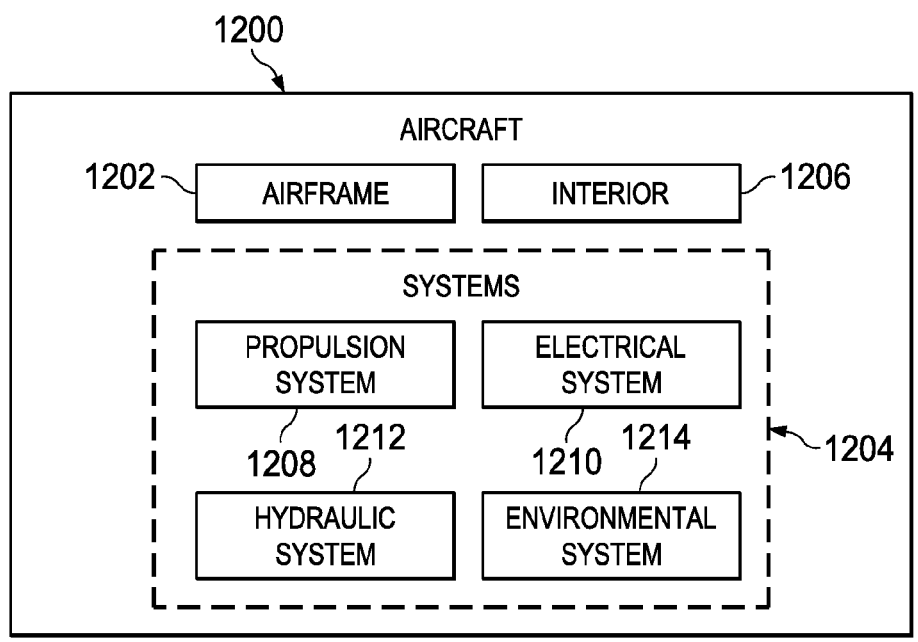
FIG. 12 is an illustration of a block diagram of an aircraft in which an illustrative embodiment may be implemented.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a military aircraft, a rotorcraft, and other suitable types of aircraft. For example, an illustration of a block diagram of aircraft 1200 is depicted in FIG. 12 described below.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, or other suitable types of platforms.

Figure 2:
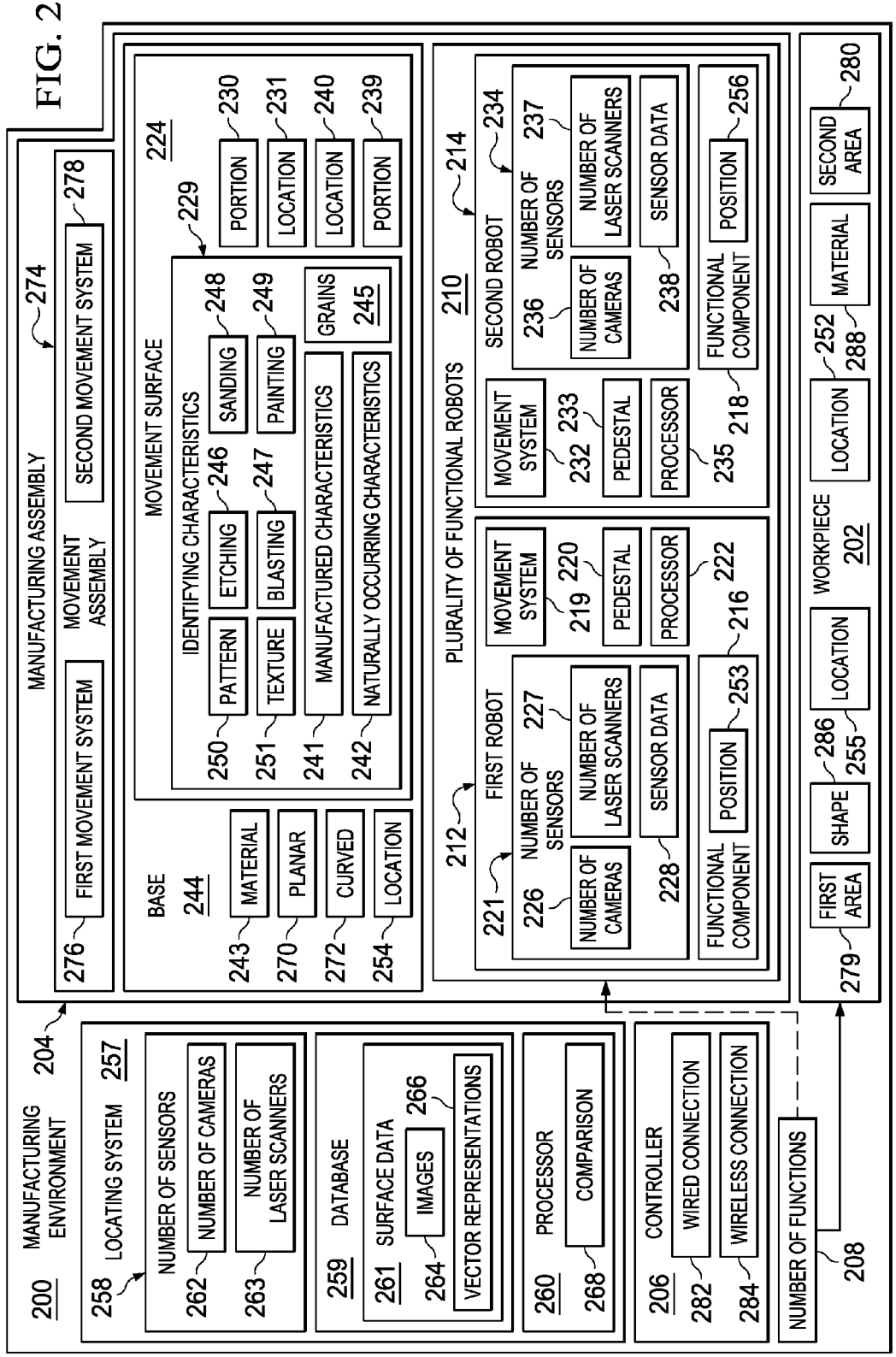
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to perform a plurality of manufacturing functions on workpiece 202. Workpiece 202 may include any desirable product or component of a product. In some illustrative examples, workpiece 202 may be a portion of aircraft 100 of FIG. 1, such as wing 102, wing 104, or body 106. In some illustrative examples, workpiece 202 may be another component of aircraft 100, such as a control surface (not depicted), a door (not depicted), or any other desirable component. Manufacturing environment 200 may include workpiece 202, manufacturing assembly 204, and controller 206.

Manufacturing assembly 204 may perform number of functions 208 on workpiece 202 using plurality of functional robots 210. In some illustrative examples, each functional component of plurality of functional robots 210 may be configured to perform a respective single function of number of functions 208.

Plurality of functional robots 210 may include first robot 212 and second robot 214. First robot 212 may have functional component 216 to perform a function of number of functions 208. In some illustrative examples, functional component 216 may be referred to as an end effector. Second robot 214 may have functional component 218 to perform a function of number of functions 208. In some illustrative examples, functional component 218 may be referred to as an end effector. In some illustrative examples, first robot 212 and second robot 214 may perform the same function. In some other illustrative examples, first robot 212 and second robot 214 may perform different functions. In one example, first robot 212 may drill a hole (not depicted) in workpiece 202 while second robot 214 may inspect another hole (not depicted) in workpiece 202. In another illustrative example, first robot 212 may apply sealant (not depicted) while second robot 214 may install fasteners (not depicted).

First robot 212 may further include movement system 219, pedestal 220, number of sensors 221, and processor 222. First robot 212 may move along movement surface 224 using movement system 219. Movement system 219 may take the form of at least one of a sawyer motor, a magnetic system, a wheel system, a track system, or some other desirable motion system.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Movement system 219 may be connected to pedestal 220. Pedestal 220 may be any desirable shape. In some illustrative examples, pedestal 220 may be a plate. Pedestal 220 may be desirably rigid to retain its shape.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Number of sensors 221 may be associated with any desirable portion of first robot 212. For example, number of sensors 221 may be connected to the same side of pedestal 220 as movement system 219. In another example, number of sensors 221 may be connected to an additional component of first robot 212. In yet a further example, number of sensors 221 may be connected to a face perpendicular to the side of pedestal 220 connected to movement system 219.

Number of sensors 221 may be any desirable type of sensors. For example, number of sensors 221 may be number of cameras 226 or number of laser scanners 227. Number of sensors 221 may form sensor data 228 as first robot 212 travels across movement surface 224. Sensor data 228 may represent identifying characteristics 229 of portion 230 of movement surface 224. Portion 230 of movement surface 224 represented by sensor data 228 may be the portion of movement surface 224 over which first robot 212 is positioned. Processor 222 may analyze sensor data 228 to determine location 231 of first robot 212 on movement surface 224.

Second robot 214 may further include movement system 232, pedestal 233, number of sensors 234, and processor 235. Second robot 214 may move along movement surface 224 using movement system 232. Movement system 232 may take the form of at least one of a sawyer motor, a magnetic system, a wheel system, a track system, or some other desirable motion system.

Movement system 232 may be connected to pedestal 233. Pedestal 233 may be any desirable shape. In some illustrative examples, pedestal 233 may be a plate. Pedestal 233 may be desirably rigid to retain its shape.

Number of sensors 234 may be associated with any desirable portion of second robot 214. For example, number of sensors 234 may be connected to the same side of pedestal 233 as movement system 232. In another example, number of sensors 234 may be connected to an additional component of second robot 214. In yet a further example, number of sensors 234 may be connected to a face perpendicular to the side of pedestal 233 connected to movement system 232.

Number of sensors 234 may be any desirable type of sensors. For example, number of sensors 234 may be number of cameras 236 or number of laser scanners 237. Number of sensors 234 may form sensor data 238 as first robot 212 travels across movement surface 224. Sensor data 238 may represent identifying characteristics 229 of portion 239 of movement surface 224. Portion 239 of movement surface 224 represented by sensor data 238 may be the portion of movement surface 224 over which second robot 214 is positioned. Processor 235 may analyze sensor data 238 to determine location 240 of second robot 214 on movement surface 224.

Movement surface 224 may have identifying characteristics 229. Identifying characteristics 229 may be manufactured characteristics 241 or naturally occurring characteristics 242.

Naturally occurring characteristics 242 may occur due to the type of material 243 forming base 244. In some illustrative examples, naturally occurring characteristics 242 may occur due to the processing of material 243 to form base 244. For example, heating or cooling to form base 244 from material 243 may change the resulting identifying characteristics 229 of movement surface 224.

An example of naturally occurring characteristics 242 may be grains 245. Grains 245 may occur due to at least one of the type of material 243 or the processing of material 243. Grains 245 of movement surface 224 may be visible at increased magnification. For example, grains 245 may be viewed using a microscopic sensor.

Manufactured characteristics 241 may be formed by techniques intended to change movement surface 224. Manufactured characteristics 241 may be formed using any desirable technique. For example, manufactured characteristics 241 may be formed using one of etching 246, blasting 247, sanding 248, or painting 249.

Manufactured characteristics 241 may take any desirable form. For example, manufactured characteristics 241 may be selected from pattern 250, texture 251, or any other desirable type of characteristic.

Using identifying characteristics 229, a respective absolute position for each of plurality of functional robots 210 moving along movement surface 224 may be determined. For example, identifying characteristics 229 may be sufficient to identify each portion of movement surface 224 uniquely.

Location 231 is an absolute position of first robot 212 on movement surface 224. After determining location 231 of first robot 212, location 252 of first robot 212 relative to workpiece 202 may be determined. Location 252 may be the location on workpiece 202 where first robot 212 performs a function. Location 252 may be determined using at least one of location 231, position 253 of functional component 216, and location 254 of base 244 relative to workpiece 202. At least one of position 253 of functional component 216, location 231 of first robot 212 on movement surface 224, or location 254 of base 244 relative to workpiece 202 may change. For example, position 253 may change by extending, manipulating, or moving functional component 216 relative to the other components of first robot 212. Location 252 may be determined as frequently as location 231 is determined.

Location 240 is an absolute position of second robot 214 on movement surface 224. After determining location 240 of second robot 214, location 255 of second robot 214 relative to workpiece 202 may be determined. Location 255 may be the location on workpiece 202 where second robot 214 performs a function. Location 255 may be determined using at least one of location 240, position 256 of functional component 218, and location 254 of base 244 relative to workpiece 202. At least one of position 256 of functional component 218, location 240 of second robot 214 on movement surface 224, or location 254 of base 244 relative to workpiece 202 may change. For example, position 256 may change by extending, manipulating, or moving functional component 218 relative to the other components of second robot 214. Location 255 may be determined as frequently as location 240 is determined.

Locating system 257 may aid in determining an absolute location of first robot 212 or second robot 214 on movement surface 224. Locating system 257 may include number of sensors 258, database 259, and processor 260.

Prior to plurality of functional robots 210 traveling across movement surface 224, number of sensors 258 may scan movement surface 224 to form surface data 261. Number of sensors 258 may scan all of movement surface 224. Number of sensors may take the form of number of cameras 262 or number of laser scanners 263.

Surface data 261 may represent identifying characteristics 229 of movement surface 224. Surface data 261 may be retained in database 259 in any desirable form. In one illustrative example, surface data 261 may be saved in database 259 as images 264. In another illustrative example, surface data 261 may be saved in database 259 as vector representations 266. Surface data 261 may include information for all of movement surface 224. Sensor data 228 and sensor data 238, in contrast, will only include information for a portion of movement surface 224.

In some illustrative examples, processor 260 of locating system 257 may compare sensor data 228 to at least a subset of surface data 261 to form comparison 268. For example, processor 260 may compare sensor data 228 to a subset of surface data 261 selected based on a previous location of first robot 212. By only comparing sensor data 228 to a subset of surface data 261, a time to form comparison 268 may be lower than comparing sensor data 228 to all of surface data 261.

Although comparison 268 is depicted in processor 260 of locating system 257, in some illustrative examples, processor 222 may form comparison 268. In these illustrative examples, locating system 257 may send all or part of surface data 261 to processor 222 of first robot 212 for analysis.

In some illustrative examples, processor 260 of locating system 257 may compare sensor data 238 to at least a subset of surface data 261 to form comparison 268. For example, processor 260 may compare sensor data 238 to a subset of surface data 261 selected based on a previous location of second robot 214. By only comparing sensor data 238 to a subset of surface data 261, a time to form comparison 268 may be lower than comparing sensor data 238 to all of surface data 261.

Although comparison 268 is depicted in processor 260 of locating system 257, in some illustrative examples, processor 235 may form comparison 268. In these illustrative examples, locating system 257 may send all or part of surface data 261 to processor 235 of second robot 214 for analysis.

Both first robot 212 and second robot 214 may move along movement surface 224 of base 244 of manufacturing assembly 204. In some illustrative examples, base 244 may be planar 270. In some illustrative examples, base 244 may be curved 272. When base 244 is curved 272, base 244 may have a constant curvature. By having a constant curvature, base 244 may be used with a sawyer motor or a magnetic system. A surface having a constant curvature may include a planar surface. In some illustrative examples, base 244 may have a constant curvature such that base 244 may be used to manufacture a portion of body 106 of aircraft 100 of FIG. 1, having a constant curvature. In other illustrative examples, base 244 may have a complex contour that is complementary to workpiece 202. For example, base 244 may have a complex contour complementary to at least one of wing 102 or wing 104 of aircraft 100 of FIG. 1.

Each of plurality of functional robots 210 may move independently of each other robot of plurality of functional robots 210 on movement surface 224 using a plurality of respective movement systems. The shape of base 244 may influence the possible equipment type for movement system 219 and movement system 232.

Manufacturing assembly 204 may also include movement assembly 274. Movement assembly 274 may move base 244 relative to workpiece 202. By moving base 244 relative to workpiece 202, movement assembly 274 may also move plurality of functional robots 210 relative to workpiece 202. Movement assembly 274 may include any desirable number of movement systems. Movement assembly 274 may include first movement system 276 and second movement system 278. In some illustrative examples, movement assembly 274 may only include one movement assembly. In some illustrative examples, movement assembly 274 may have more than two movement systems. Movement assembly 274 may take the form of at least one of a number of manipulators, a number of robots, a number of cranes, a number of crawlers, or any other desirable type of movement systems.

Plurality of functional robots 210 moving on movement surface 224 may have micro movements relative to workpiece 202. Moving plurality of functional robots 210 relative to workpiece 202 by moving base 244 using movement assembly 274 may include macro movements relative to workpiece 202.

When plurality of functional robots 210 are performing number of functions 208, base 244 is stationary relative to workpiece 202. Accordingly, the position of base 244 relative to workpiece 202 may be known prior to performing number of functions 208 using plurality of functional robots 210. The position of base 244 relative to workpiece 202 may be determined using a metrology system.

Manufacturing assembly 204 may be used to perform number of functions 208 in first area 279. Movement assembly 274 may move base 244 relative to workpiece 202 such that plurality of functional robots 210 may access first area 279. Second area 280 may not be accessible by plurality of functional robots 210 when base 244 is positioned relative to first area 279. In some illustrative examples, base 244 may be moved relative to second area 280 so that plurality of functional robots 210 may perform number of functions 208 within second area 280.

Controller 206 may be configured to number of functions 208 on workpiece 202 using at least one of functional component 216 or functional component 218. Controller 206 may be implemented in software, hardware, firmware, or a combination thereof. When software is used, the operations performed by controller 206 may be implemented in program code configured to run on a processor unit. When firmware is used, the operations performed by controller 206 may be implemented in program code and data and stored in persistent memory to run on a processor unit. When hardware is employed, the hardware may include circuits that operate to perform the operations in controller 206.

Controller 206 may communicate with at least one robot of plurality of functional robots 210. Controller 206 may direct or control number of functions 208 by first robot 212. Controller 206 may direct or control number of functions 208 by second robot 214.

In some illustrative examples, controller 206 may communicate with at least one robot of plurality of functional robots 210 using wired connection 282. In some illustrative examples, controller 206 may communicate with at least one robot of plurality of functional robots 210 using wireless connection 284. In some illustrative examples, each of plurality of functional robots 210 may be associated with a respective wireless communication device and a respective battery so that each of plurality of functional robots 210 may be wireless.

The location of each of plurality of functional robots 210 relative to each other may be important during number of functions 208. Further, properly locating plurality of functional robots 210 relative to workpiece 202 may be extremely important. For example, drilling, inspecting, laying composite tape, sealing, or any other desirable function may require a high level of precision. Controller 206 may communicate with other systems or components to track, control, or locate at least one robot of plurality of functional robots 210. For example, controller 206 may communicate with locating system 257. In some illustrative examples, controller 206 may communicate with a different real-time locating system. The real-time locating system may use any desirable technology. For example, the real-time locating system may use radio-frequency identification (RFID), optical sensors, acoustic sensors, or any other desirable type of locating technology. In some examples, the real-time locating system may be a form of a global positioning system (GPS).

Location 252 of functional component 216 relative to workpiece 202 may depend on at least one of location 254 of base 244 relative to workpiece 202, location 231 of first robot 212 on movement surface 224, the location of workpiece 202 within manufacturing environment 200, and shape 286 of workpiece 202. In some illustrative examples, shape 286 of workpiece 202 may be known prior to performing number of functions 208 on workpiece 202. For example, shape 286 may be a designed shape for workpiece 202.

In some illustrative examples, shape 286 may change. For example, some of plurality of functional robots 210 may lay down composite tape (not depicted). If composite tape (not depicted) is being laid down on workpiece 202, changes to shape 286 may be tracked by tracking the progress of laying down the composite tape. Changes to shape 286 may be taken into account when determining a location of a robot of plurality of functional robots 210 relative to workpiece 202. For example, changes to shape 286 may be used in determining location 252 or location 255.

As another example, material 288 of workpiece 202 may expand or contract due to temperature changes in manufacturing environment 200. Expanding or contracting of material 288 may change shape 286 of workpiece 202. Changes to shape 286 may affect the locations of number of functions 208. For example, the position of functional component 216 relative to workpiece 202 may be different from an expected position. Tracking changes to shape 286 due to temperature changes may be undesirably difficult.

In some illustrative examples, material 243 of base 244 and material 288 of workpiece 202 may be the same. When material 243 and material 288 are the same, base 244 may also expand or contract due to temperature changes in manufacturing environment 200. When material 243 and material 288 are the same, base 244 and workpiece 202 may have similar expansion or contraction. By base 244 and workpiece 202 having similar expansion and contraction, positions of functional component 216 and functional component 218 may remain within a desired accuracy relative to workpiece 202, so that number of functions 208 is within acceptable tolerances.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a second manufacturing assembly (not depicted) may have a respective plurality of functional robots (not depicted) which may perform functions on workpiece 202. The second manufacturing assembly (not depicted) may be positioned relative to workpiece 202 so that the plurality of functional robots (not depicted) on the second manufacturing assembly may perform functions on a different area of workpiece 202 than plurality of functional robots 210 of manufacturing assembly 204.

As another example, at least one robot of plurality of functional robots 210 may include additional components that are not depicted in FIG. 2. For example, at least one of first robot 212 or second robot 214 may include a positioning system (not depicted). The positioning system (not depicted) may move functional component 216 or functional component 218 relative to workpiece 202.

The positioning system (not depicted) may take any desirable form. In some illustrative examples, the positioning system (not depicted) may be a hexapod platform. A hexapod platform (not depicted) may be a type of parallel robot that may include six actuators. In other illustrative examples, the positioning system (not depicted) may be a serial stacked system. A serial stacked system (not depicted) may include a plurality of stacked actuators, each configured to move in different directions.

Figure 3:
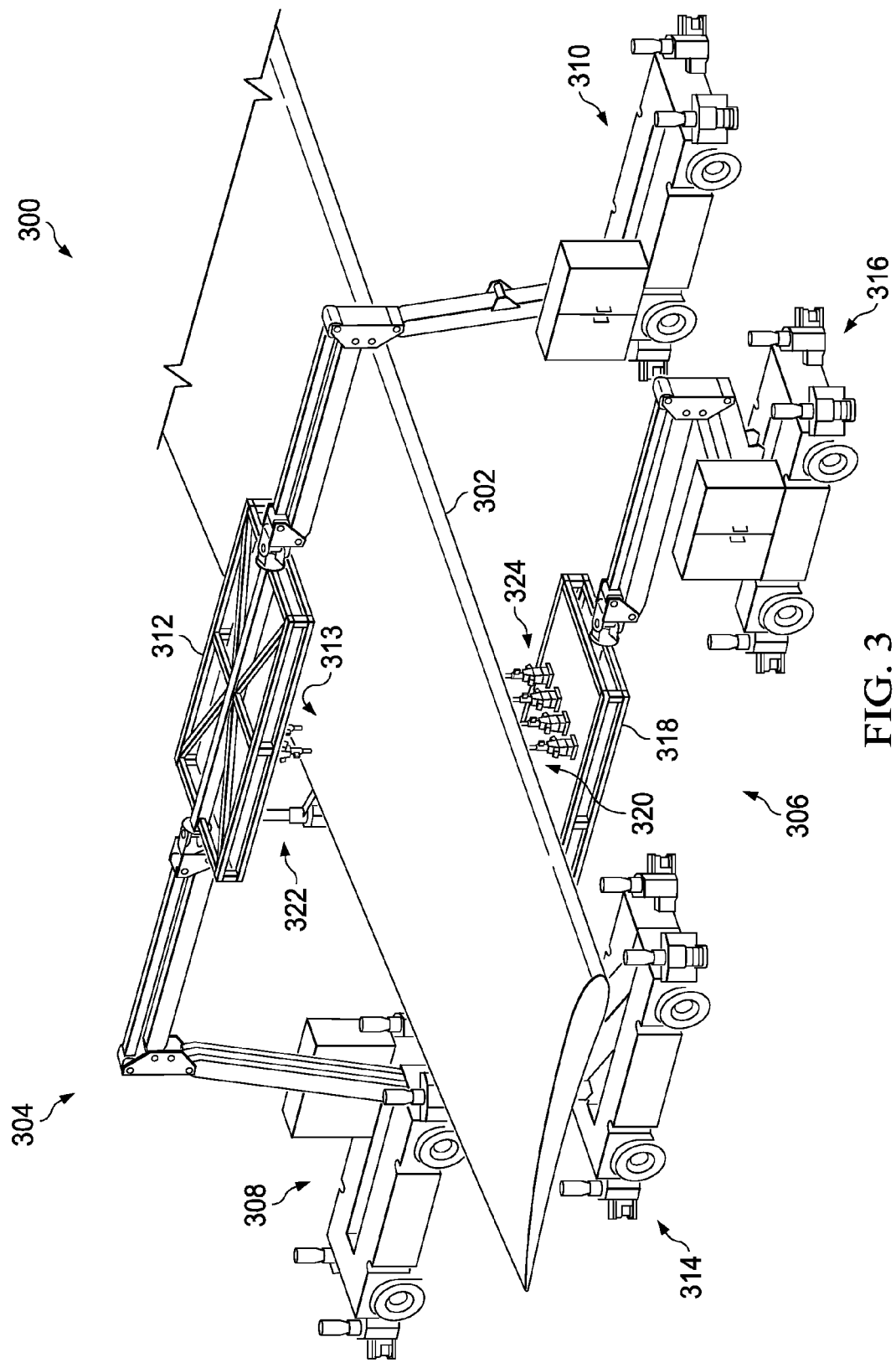
FIG. 3 is an illustration of a manufacturing environment in accordance with an illustrative embodiment.

Turning now to FIG. 3, an illustration of a manufacturing environment is depicted in accordance with an illustrative embodiment. Manufacturing environment 300 may be a physical implementation of manufacturing environment 200 shown in block form in FIG. 2. Manufacturing environment 300 may be an example of an environment in which manufacturing functions may be performed on components of aircraft 100 of FIG. 1, such as wing 102 or wing 104.

Manufacturing environment 300 may include workpiece 302, manufacturing assembly 304, and manufacturing assembly 306. Workpiece 302 may be an example of wing 102 of FIG. 1 prior to attaching wing 102 to aircraft 100. Manufacturing assembly 304 may include movement system 308, movement system 310, and base 312. Workpiece 302 is depicted as substantially planar. As a result, base 312 is also substantially planar. Base 312 may have a substantially constant curvature that complements the shape of workpiece 302. As a result, if workpiece 302 is curved, base 312 may also be curved.

Base 312 may be positioned relative to first area 313 of workpiece 302. Movement system 308 and movement system 310 may move base 312 to position base 312 relative to desired areas of workpiece 302. Manufacturing assembly 306 may include movement system 314, movement system 316, and base 318. Base 318 may be positioned relative to second area 320 of workpiece 302. Movement system 314 and movement system 316 may move base 318 to position base 318 relative to desired areas of workpiece 302.

Plurality of functional robots 322 is associated with base 312. Plurality of functional robots 324 is associated with base 318. As depicted, base 312 and base 318 face workpiece 302 such that plurality of functional robots 322 and plurality of functional robots 324 may work on workpiece 302.

Manufacturing environment 300 of FIG. 3 is not meant to imply physical or architectural limitations to the manner in which an illustrative embodiment may be implemented. Other components in addition to or in place of the ones illustrated may be used. Some components may be unnecessary. For example, instead of movement system 308 and movement system 310 of manufacturing assembly 304, a number of alternative movement systems may be present. For example, manufacturing assembly 304 may instead have a single robotic arm. As another example, manufacturing assembly 304 may include a crane.

Figure 4:
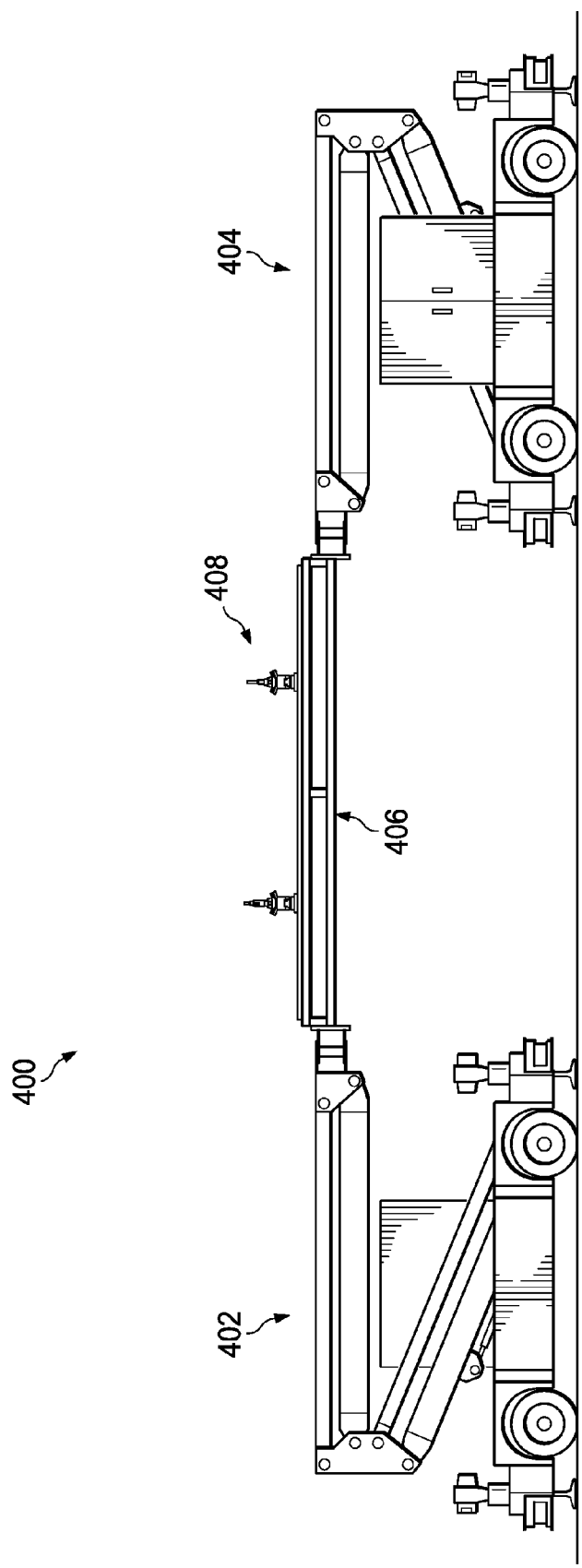
FIG. 4 is an illustration of a manufacturing assembly in accordance with an illustrative embodiment.

Turning now to FIG. 4, an illustration of a manufacturing assembly is depicted in accordance with an illustrative embodiment. Manufacturing assembly 400 may be a physical implementation of manufacturing assembly 204 shown in block form in FIG. 2. Manufacturing assembly 400 may be a depiction of manufacturing assembly 304 or manufacturing assembly 306 of FIG. 3.

Manufacturing assembly 400 may include movement system 402, movement system 404, base 406, and plurality of robots 408. Movement system 402 and movement system 404 may move base 406 and plurality of robots 408 in at least one dimension. Movement system 402 may be a physical implementation of first movement system 276 while movement system 404 may be a physical implementation of second movement system 278 of FIG. 2. Plurality of robots 408 may be a physical implementation of plurality of functional robots 210 while base 406 may be a physical implementation of base 244 of FIG. 2. Plurality of robots 408 may move relative to base 406.

Figure 5:
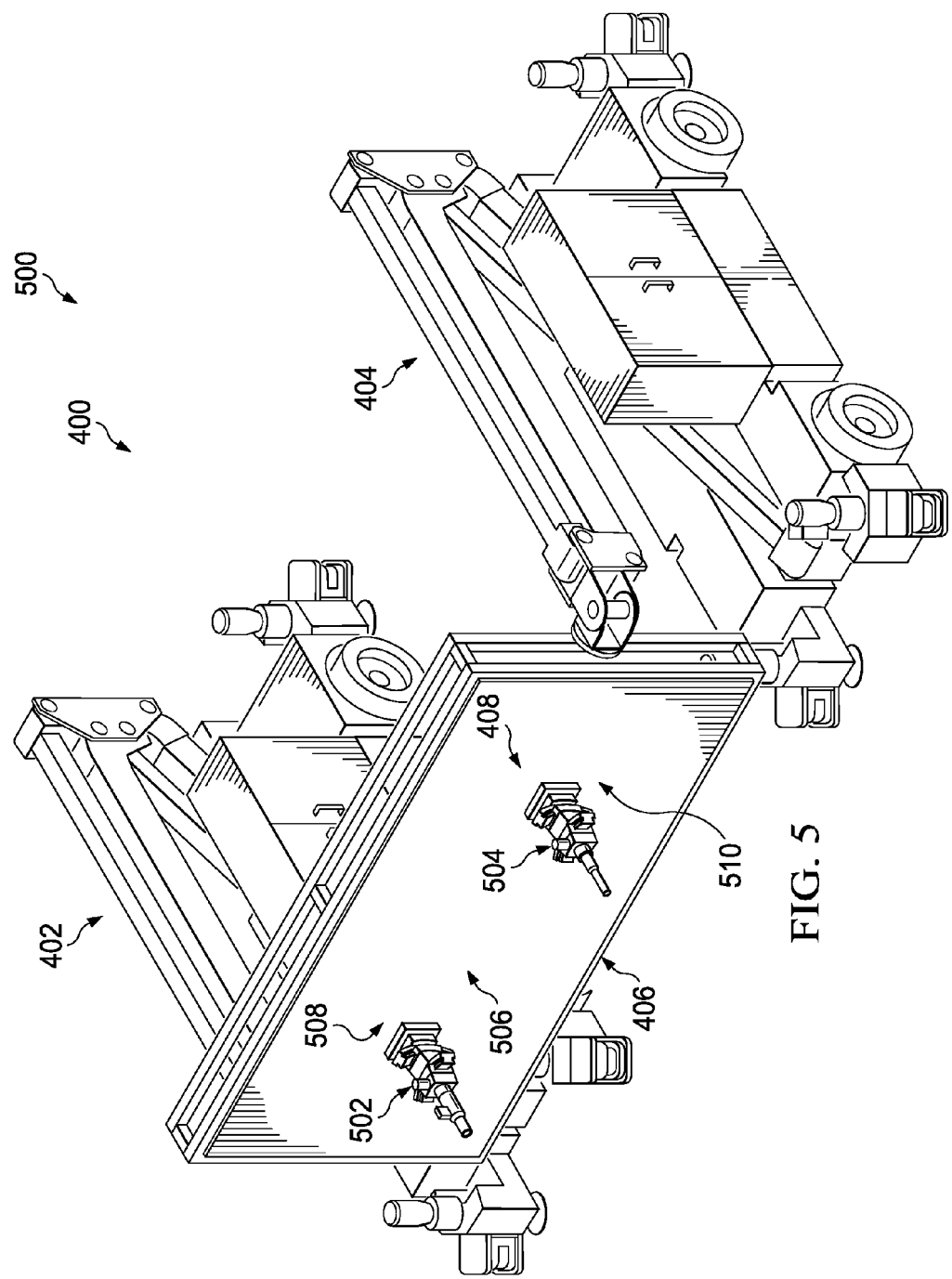
FIG. 5 is an illustration of a manufacturing assembly in accordance with an illustrative embodiment.

Turning now to FIG. 5, an illustration of a manufacturing assembly is depicted in accordance with an illustrative embodiment. View 500 may be a view of manufacturing assembly 400 after moving movement system 402 and movement system 404. View 500 may be a view of manufacturing assembly 400 such that each of movement system 402, movement system 404, and base 406 face sideways.

Manufacturing assembly 400, as positioned in FIG. 4, may work on a horizontal workpiece. For example, manufacturing assembly 400, as shown in FIG. 4, may work on a surface substantially parallel to the ground. Manufacturing assembly 400, as positioned in view 500, may be used to work on a vertical workpiece. For example, manufacturing assembly 400, as shown in FIG. 5, may be used to work on a surface substantially perpendicular to the ground. Base 406 could potentially be held at any angle relative to the ground. Further, although two movement systems are depicted, base 406 could be held and moved by any number of movement systems.

As can be seen in view 500, each of plurality of robots 408 may move independently of each other. For example, robot 502 may move in any direction relative to base 406, including around or to the opposite side of robot 504. Robot 502 and robot 504 may have coordinated movements so a collision is avoided. These coordinated movements may allow multiple robots to work at the same time, increasing production rate over the production rate of a single robot. However, robot 502 and robot 504 may move in any desirable direction independent of the motion of the other.

In view 500, movement surface 506 is visible. Movement surface 506 may have identifying characteristics (not depicted). Robot 502 and robot 504 may self-locate on movement surface 506 using identifying characteristics (not depicted). For example, robot 502 and robot 504 may be associated with respective sensors (not depicted). The respective sensors may face movement surface 506. The respective sensors may form sensor data as robot 502 and robot 504 travel across movement surface 506.

The sensor data may represent identifying characteristics of a portion of movement surface 506. Specifically, a number of sensors associated with robot 502 may form sensor data representing identifying characteristics of portion 508 of movement surface 506 beneath robot 502. As another example, a number of sensors associated with robot 504 may form sensor data representing identifying characteristics of portion 510 of movement surface 506 beneath robot 504.

Robot 502 and robot 504 may move based on instructions from a number of controllers (not depicted). The number of controllers (not depicted) may be physically associated with robot 502 and robot 504 or may be external to robot 502 and robot 504. The instructions sent by the number of controllers may take into account the shape of base 406, the shape of the workpiece (not depicted) to receive functions, and the location of base 406 relative to the workpiece (not depicted).

In some illustrative examples, desired functions may be saved in a program. The program may take into account the shape of base 406.

Figure 6:
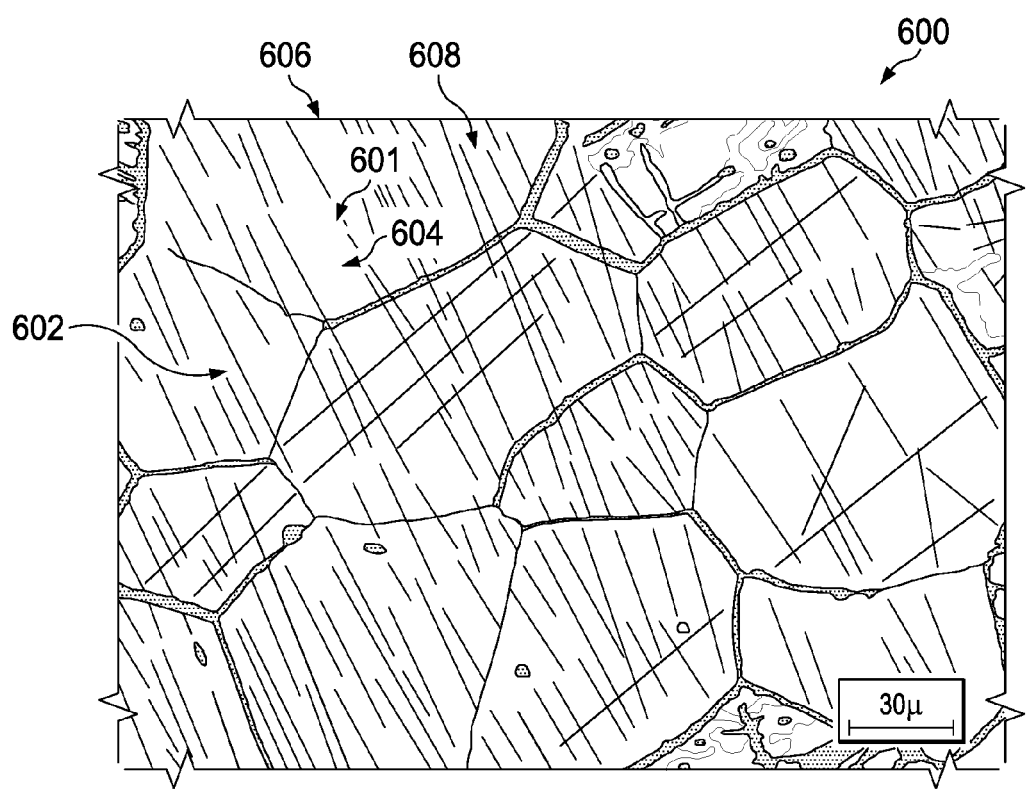
FIG. 6 is an illustration of a magnified portion of a movement surface in accordance with an illustrative embodiment.

Turning now to FIG. 6, an illustration of a magnified portion of a movement surface is depicted in accordance with an illustrative embodiment. View 600 may be a view of a portion of movement surface 224 of FIG. 2. View 600 may be a view of a portion of movement surface 506 of FIG. 5.

View 600 depicts identifying characteristics 601. Identifying characteristics 601 may include grains 602. Grains 602 may be examples of naturally occurring characteristics 604 of movement surface 606. Grains 602 may form naturally during formation of movement surface 606. Grains 602 may be influenced by at least one of heating temperature, heating time, cooling time, or any other desirable formation parameters.

At least one of size, shape, or color of grains 602 may uniquely identify portion 608 of movement surface 606. View 600 may be different from a view of any other portion of movement surface 606.

Although identifying characteristics 601 are depicted as grains 602, identifying characteristics 601 may take any desirable form. In some alternative examples, identifying characteristics 601 may include a surface texture or a pattern. When identifying characteristics 601 are a surface texture, the surface texture may be formed using a mechanical or chemical process such as etching, buffing, sanding, or blasting. When identifying characteristics 601 are a pattern, the pattern may be formed using any desirable method. For example, a pattern may be formed by painting the surface.

Robots (not depicted) may move based on instructions from a number of controllers (not depicted). The instructions sent by the number of controllers may take into account identifying characteristics 601. In some illustrative examples, desired functions may be saved in a program. The program may identify functions based on the location of a robot based on identifying characteristics 601. To directly link desired functions on workpiece (not depicted) with identifying characteristics 601 of the base (not depicted), the location of the base relative to the workpiece may be used.

Figure 7:
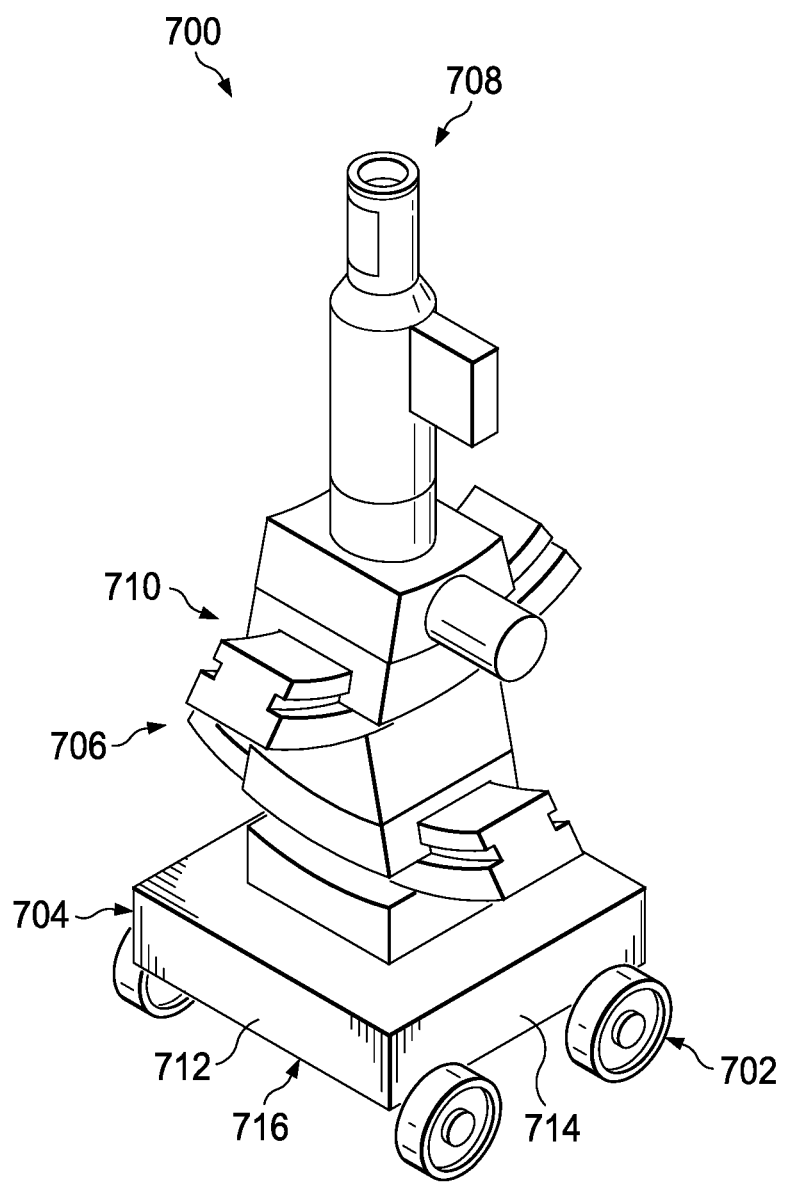
FIG. 7 is an illustration of a robot in accordance with an illustrative embodiment.

Turning now to FIG. 7, an illustration of a robot is depicted in accordance with an illustrative embodiment. Robot 700 may be a physical implementation of one of plurality of functional robots 210 of FIG. 2. For example, robot 700 may be a physical implementation of first robot 212 of FIG. 2.

Robot 700 may include movement system 702, pedestal 704, positioning system 706, and functional component 708. As depicted, positioning system 706 may take the form of serial stacked system 710.

Robot 700 may be associated with a number of sensors (not depicted). The number of sensors (not depicted) may be associated with pedestal 704. For example, the number of sensors (not depicted) may be associated with side 712, or side 714 of pedestal 704. In some illustrative examples, the number of sensors (not depicted) may be associated with face 716 of pedestal 704 connected to movement system 702.

The number of sensors (not depicted) may be depicted so that the number of sensors (not depicted) face a movement surface (not depicted). Movement system 702 may contact the movement surface (not depicted) so that robot 700 may travel along the movement surface (not depicted).

In some illustrative examples, robot 700 may also have a controller (not depicted). In other illustrative examples, robot 700 may have a wireless communication device (not depicted) to allow robot 700 to communicate with a controller (not depicted) external to robot 700, such as controller 206 of FIG. 2. In one illustrative example, robot 700 may communicate with controller 206 of wireless connection 282.

The illustrations of aircraft 100 in FIG. 1, manufacturing environment 200 in FIG. 2, manufacturing assemblies in FIGS. 3-5, identifying characteristics 601 in FIG. 6, and robot 700 in FIG. 7 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of functional robots 210 is depicted as having first robot 212 and second robot 214, plurality of functional robots 210 may contain any desirable number of robots greater than or equal to two. For example, plurality of functional robots 210 may include three functional robots. As another example, plurality of functional robots 210 may include four functional robots.

Further, manufacturing assembly 204 may include more than one controller. For example, manufacturing assembly 204 may include more controllers than just controller 206. For example, another controller may communicate with at least one robot of plurality of functional robots 210 using at least one of wired connection 282 or wireless connection 284. Yet further, manufacturing assembly 204 may include a system of controllers.

The different components shown in FIGS. 1 and 3-7 may be combined with components in FIG. 2, used with components in FIG. 2, or a combination of the two. Additionally, some of the components in FIGS. 1 and 3-7 may be illustrative examples of how components shown in block form in FIG. 2 may be implemented as physical structures.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Figure 8:
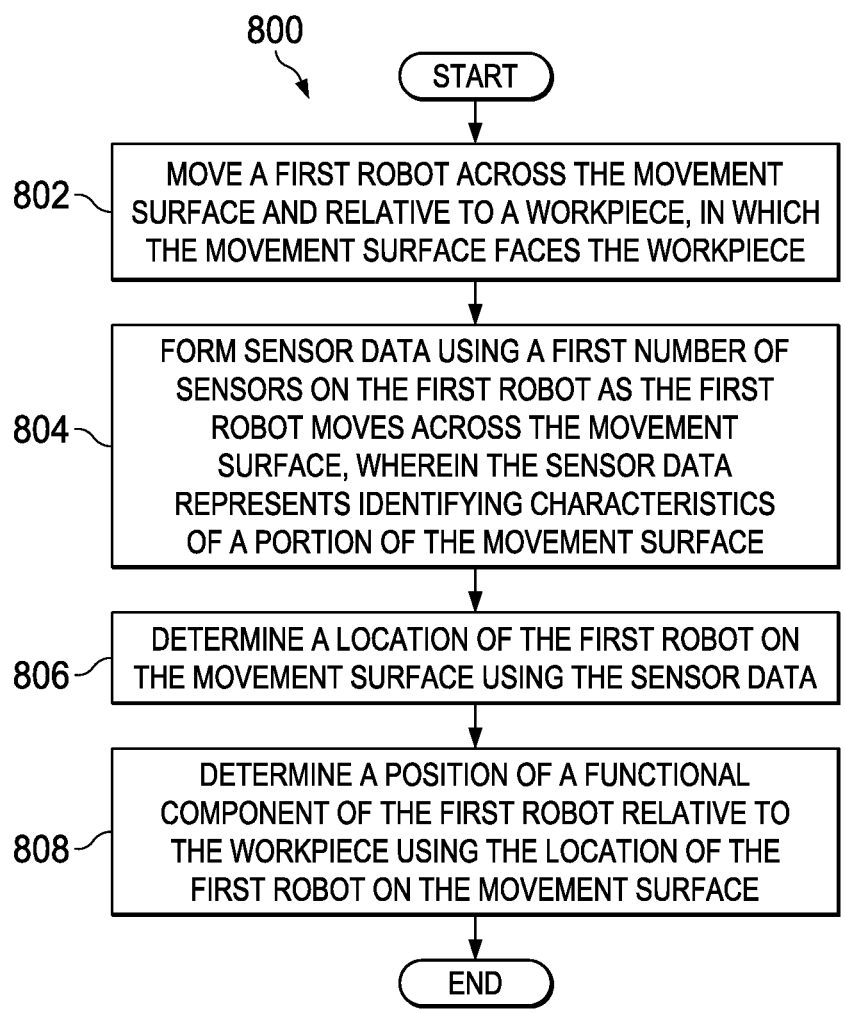
FIG. 8 is an illustration of a flowchart of a process of a robot self-locating on a movement surface in accordance with an illustrative embodiment.

Turning now to FIG. 8, an illustration of a flowchart of a process of a robot self-locating on a movement surface is depicted in accordance with an illustrative embodiment. Process 800 may be a process of self-locating first robot on movement surface of FIG. 2. Process 800 may be a process of self-locating first robot on movement surface of FIG. 5.

Process 800 may first move a first robot across the movement surface and relative to a workpiece, in which the movement surface faces the workpiece (operation 802). Process 800 may also form sensor data using a first number of sensors on the first robot as the first robot moves across the movement surface, wherein the sensor data represents identifying characteristics of a portion of the movement surface (operation 804). The sensor data comprises at least one of images or vector representations. The identifying characteristics are at least one of a pattern or a texture. Although identifying characteristics are described as at least one of a pattern or a texture, in some examples, the identifying characteristics may take a different identity. For example, identifying characteristics may be RFIDs on or embedded in the movement surface.

Process 800 may further determine a location of the first robot on the movement surface using the sensor data (operation 806). In some illustrative examples, determining the location of the first robot on the movement surface using the sensor data may comprise comparing the sensor data to the surface data to form a comparison; and determining the location of the first robot on the movement surface using the comparison.

Process 800 may determine a location of a functional component of the first robot relative to the workpiece using the location of the first robot on the movement surface (operation 808). Afterwards, the process terminates.

Figure 9:
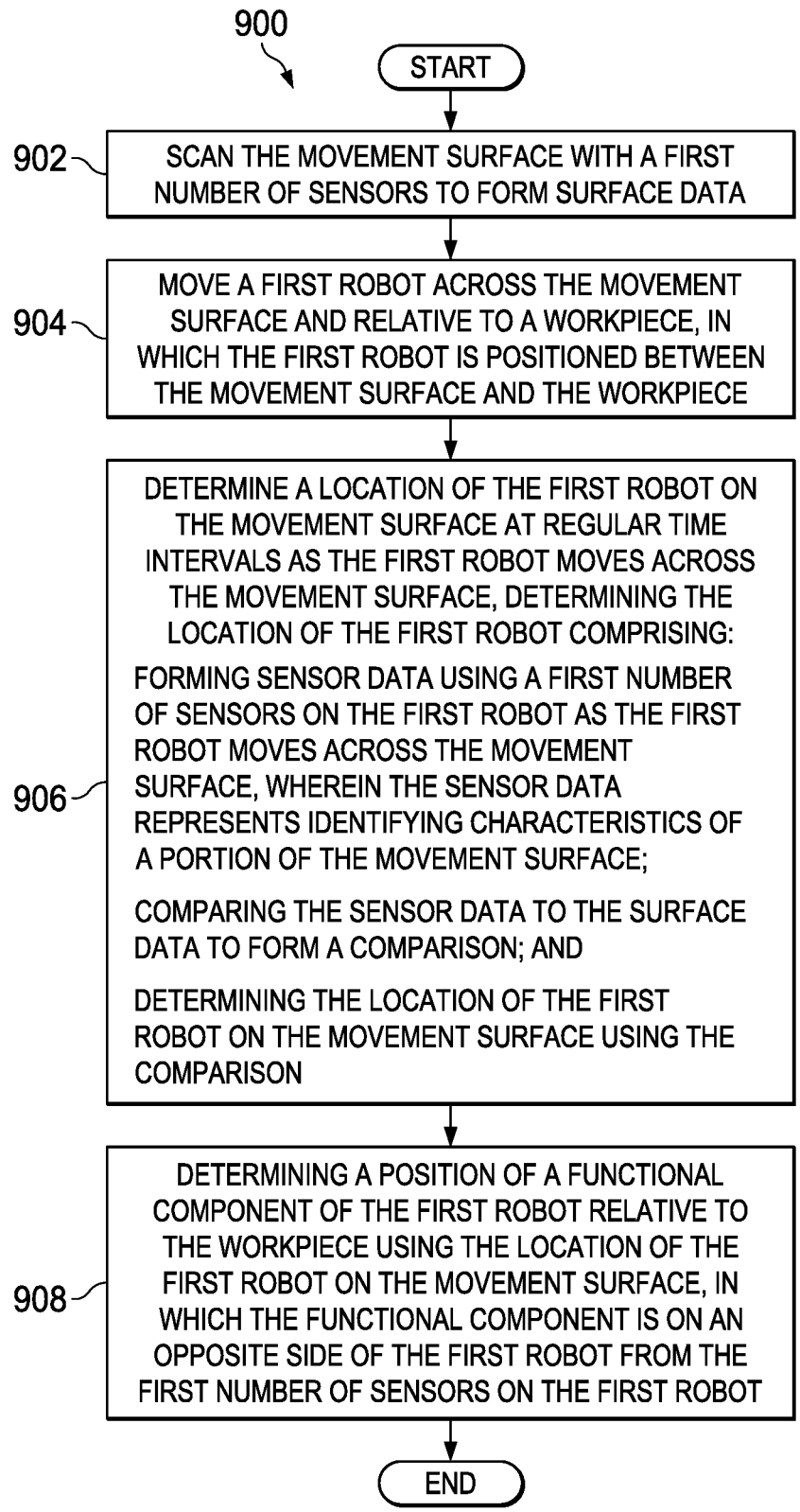
FIG. 9 is an illustration of a flowchart of a process of a robot self-locating on a movement surface in accordance with an illustrative embodiment.

Turning now to FIG. 9, an illustration of a flowchart of a process of a robot self-locating on a movement surface is depicted in accordance with an illustrative embodiment. Process 900 may be a process of self-locating first robot on movement surface of FIG. 2. Process 900 may be a process of self-locating first robot on movement surface of FIG. 5.

Process 900 may first scan the movement surface with a first number of sensors to form surface data (operation 902). Process 900 may move a first robot across the movement surface and relative to a workpiece, in which the first robot is positioned between the movement surface and the workpiece (operation 904). By moving the first robot across the movement surface, the first robot may move relative to the workpiece, without moving a robot drive system over the workpiece. The first robot may move across the movement surface, but may perform functions on the workpiece.

Process 900 may then determine a location of the first robot on the movement surface at regular time intervals as the first robot moves across the movement surface. Determining the location of the first robot may comprise forming sensor data using a first number of sensors on the first robot as the first robot moves across the movement surface, comparing the sensor data to the surface data to form a comparison, and determining the location of the first robot on the movement surface using the comparison. The sensor data may represent identifying characteristics of a portion of the movement surface (operation 906). In some illustrative examples, the identifying characteristics comprise at least one of a pattern or a texture. By determining Process 900 may further determine a location of a functional component of the first robot relative to the workpiece using the location of the first robot on the movement surface, in which the functional component is on an opposite side of the first robot from the first number of sensors on the first robot (operation 908)). Afterwards, the process terminates. The number of sensors of the first robot may face the movement surface while the functional component may perform functions on the workpiece. The location of the functional component may be determined using other information in addition to the location of the first robot on the movement surface. For example, determining the location of the functional component of the first robot may also use at least one of a position of the functional component, a location of a base having the movement system relative to the workpiece, or a location of the workpiece within a manufacturing environment.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 800 may also comprise scanning the movement surface with a second number of sensors to form surface data and saving the surface data to a database. In some examples, process 800 may further select a subset of surface data based on at least one of metrology data or a previous position of the first robot, compare the sensor data to the subset of the surface data to form a comparison, and determine the location of the first robot on the movement surface using the comparison.

In some illustrative examples, in process 800, the movement surface may face a workpiece, and the first robot is positioned between the movement surface and the workpiece. In these examples, process 800 may further comprise performing a function on the workpiece using the first robot after determining the location of the first robot. The first robot may perform the function based on instructions from the controller. In some illustrative examples, the controller may send instructions based on the location of the functional component relative to the workpiece. In some illustrative examples, the controller may send instructions based on the location of the first robot on the movement surface. In other examples, process 800 may also comprise repeating the forming and determining steps at regular time intervals as the first robot moves across the movement surface.

In yet other examples, process 800 may also comprise moving a second robot across the movement surface, forming second sensor data using a second number of sensors on the second robot as the second robot moves across the movement surface, and determining a location of the second robot on the movement surface using the second sensor data. In these examples, the second sensor data may represent identifying characteristics of a portion of the movement surface.

As yet another example, in process 900, the movement surface may face a workpiece. The first robot may be positioned between the movement surface and the workpiece. Further, process 900 may further comprise performing a function on the workpiece using the first robot after determining the location of the first robot.

Figure 10:
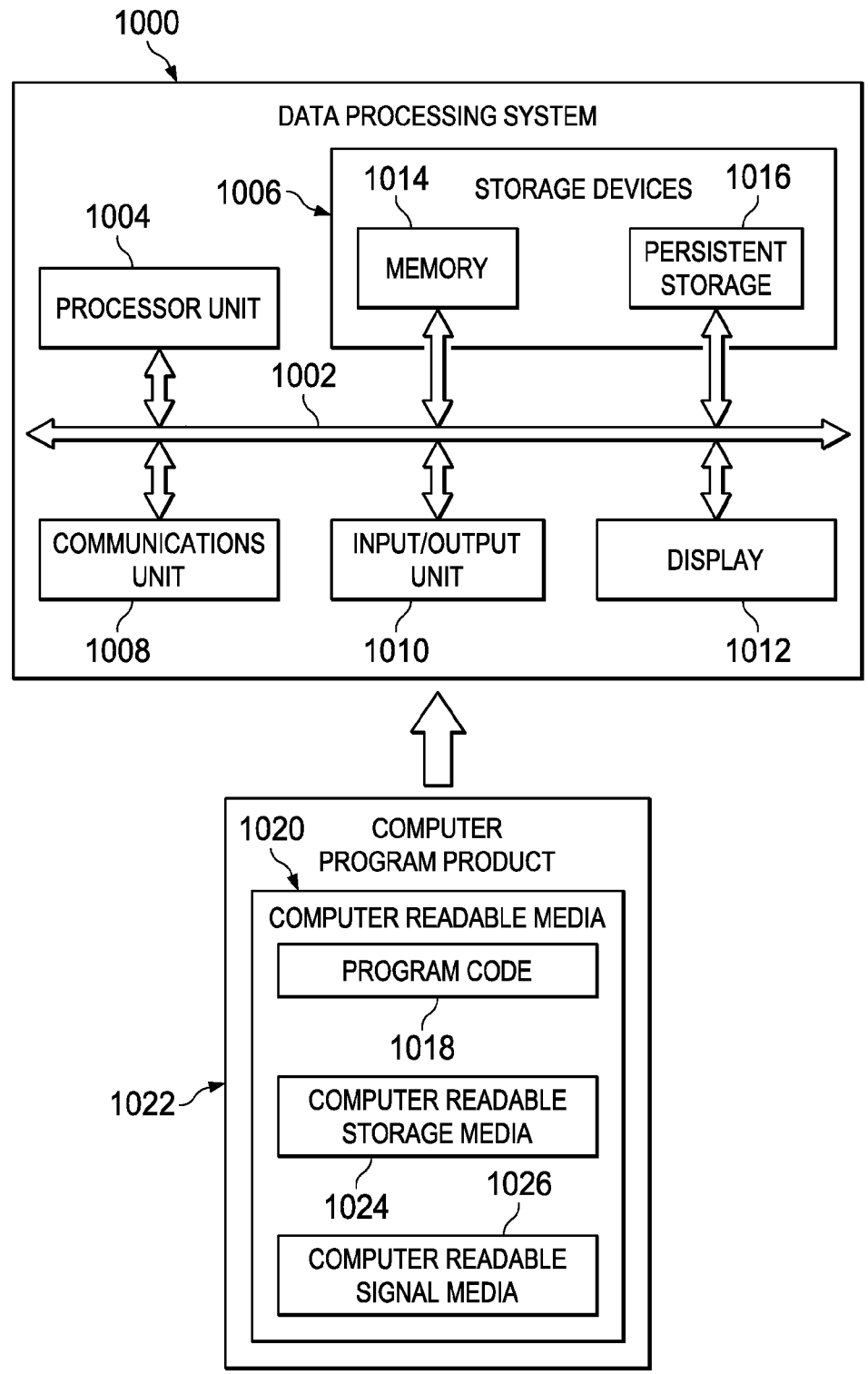
FIG. 10 is an illustration of a data processing system in the form of a block diagram in accordance with an illustrative embodiment.

Turning now to FIG. 10, an illustration of a data processing system is depicted in the form of a block diagram in accordance with an illustrative embodiment. Data processing system 1000 may be used to implement controller 206 in FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multiprocessor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code, and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018, rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

Figure 11:
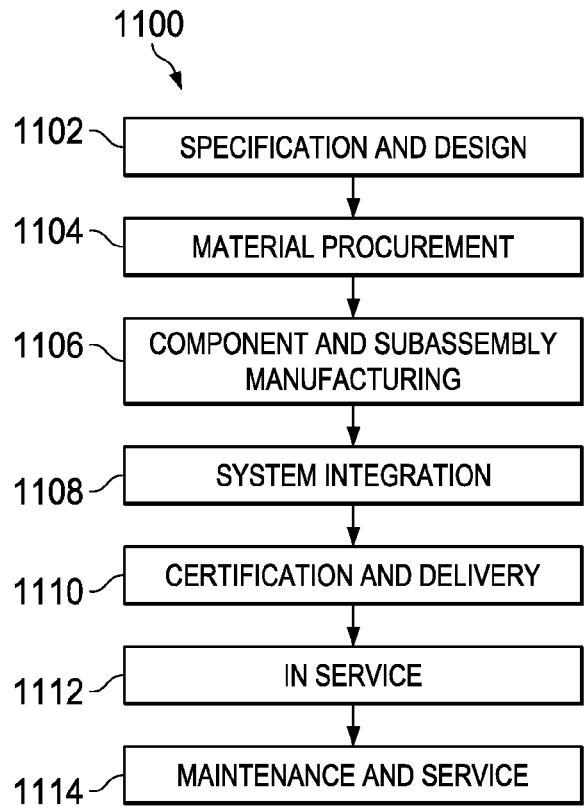
FIG. 11 is an illustration of a block diagram of an aircraft manufacturing and service method in accordance with an illustrative embodiment.

The illustrative embodiments of the disclosure may be described in the context of aircraft manufacturing and service method 1100, as shown in FIG. 11, and aircraft 1200, as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with a plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1100 in FIG. 11. One or more illustrative embodiments may be used during component and subassembly manufacturing 1106. For example, manufacturing assembly 204 may be used to perform number of functions 208 on workpiece 202 of FIG. 2 during component and subassembly manufacturing 1106. As manufacturing assembly 204 performs number of functions 208, plurality of functional robots 210 may self-locate on movement surface 224. Further, manufacturing assembly 204 may also be used to perform maintenance during maintenance and service 1114. Manufacturing assembly 204 may perform number of functions 208 on any component of airframe 1202 during at least one of component and subassembly manufacturing 1106 or maintenance and service 1114.

The illustrative embodiments may provide a method and apparatus for robots to self-locate as they travel along a movement surface. Each robot may be associated with a number of sensors. The number of sensors may form sensor data representative of identifying characteristics of the movement surface. The identifying characteristics may be either naturally occurring or manufactured. In some illustrative examples, the identifying characteristics may be one of a pattern or a texture. In one illustrative example, the identifying characteristics may be the grains of the material of the movement surface.

By comparing the sensor data to at least a portion of surface data representing the identifying characteristics of the movement surface, a specific location on the movement surface may be identified. Identifying characteristics may vary sufficiently across the movement surface such that any sensor data may only correspond to a single location on the movement surface.

By self-locating using sensor data, robots may have a more accurate determined location than by estimating a location using odometry. A self-locating robot may have a more accurate determined location than other conventional techniques. Further, a self-locating robot may perform functions within selected tolerances by having a desired accuracy in a determined location.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of a robot self-locating on a movement surface, the method comprising:
   moving a first robot across the movement surface and relative to a workpiece, in which the movement surface faces the workpiece;
   forming sensor data using a first number of sensors on the first robot as the first robot moves across the movement surface, in which the sensor data represents a portion of the movement surface;
   determining a location of the first robot on the movement surface using the sensor data; and
   determining a location of a functional component of the first robot relative to the workpiece using the location of the first robot on the movement surface;
   wherein the functional component is on an opposite side of the first robot from the first number of sensors on the first robot; and
   wherein the functional component comprises an end effector.

2. The method of claim 1 further comprising:
   scanning the movement surface with a second number of sensors to form surface data; and
   saving the surface data to a database.

3. The method of claim 2, wherein determining the location of the first robot on the movement surface using the sensor data comprises:
   comparing the sensor data to the surface data to form a comparison; and
   determining the location of the first robot on the movement surface using the comparison.

4. The method of claim 3, wherein the sensor data comprises at least one of images or vector representations.

5. The method of claim 2 further comprising:
   selecting a subset of the surface data based on at least one of metrology data or a previous position of the first robot;
   comparing the sensor data to the subset of the surface data to form a comparison; and determining the location of the first robot on the movement surface using the comparison.

6. The method of claim 1, wherein the movement surface faces the workpiece and the first robot is positioned between the movement surface and the workpiece, and further comprising:
performing a function on the workpiece using the first robot after determining the location of the first robot;
wherein the workpiece is a portion of an aircraft.

7. The method of claim 1 further comprising:
repeating forming and determining steps at regular time intervals as the first robot moves across the movement surface.

8. The method of claim 1 further comprising:
moving a second robot across the movement surface;
forming second sensor data using a second number of sensors on the second robot as the second robot moves across the movement surface, wherein the second sensor data represents identifying characteristics of a portion of the movement surface; and
determining a location of the second robot on the movement surface using the second sensor data.

9. The method of claim 1, wherein the portion of the movement surface is selected from a group consisting of a pattern on the movement surface, a texture of the movement surface, a grain of the movement surface, an RFID on the movement surface, and an RFID embedded in the movement surface.

10. A method of a robot self-locating on a movement surface, the method comprising:
scanning the movement surface with a first number of sensors to form surface data;
moving a first robot across the movement surface and relative to a workpiece, in which the first robot is positioned between the movement surface and the workpiece;
determining a location of the first robot on the movement surface at regular time intervals as the first robot moves across the movement surface, determining the location of the first robot comprising:
forming sensor data using a second number of sensors on the first robot as the first robot moves across the movement surface, wherein the sensor data represents a portion of the movement surface;
comparing the sensor data to the surface data to form a comparison; and
determining the location of the first robot on the movement surface using the comparison; and
determining a location of a functional component of the first robot relative to the workpiece using the location of the first robot on the movement surface, in which the functional component is on an opposite side of the first robot from the second number of sensors on the first robot;
wherein the functional component is on an opposite side of the first robot from the first number of sensors on the first robot; and
wherein the functional component comprises an end effector.

11. The method of claim 10, wherein the movement surface faces the workpiece and the first robot is positioned between the movement surface and the workpiece, and further comprising:
performing a function on the workpiece using the first robot after determining the location of the first robot;
wherein the workpiece is a portion of an aircraft.

12. An apparatus comprising:
a movement surface;
a first robot associated with the movement surface; and
a number of sensors associated with the first robot and facing the movement surface;
wherein a functional component is on an opposite side of the first robot from the first number of sensors associated with the first robot.

13. The apparatus of claim 12, wherein the movement surface comprises at least one of a pattern or a texture.

14. The apparatus of claim 13, wherein at least one of the pattern or the texture may be formed by sanding, etching, blasting, or painting.

15. The apparatus of claim 12, wherein the movement surface includes grains of a material of a base.

16. The apparatus of claim 12, wherein the movement surface comprises at least one of manufactured characteristics or naturally occurring characteristics.

17. The apparatus of claim 12, wherein the number of sensors comprises a number of cameras or a number of laser scanners.

18. The apparatus of claim 12 further comprising:
a workpiece, wherein the movement surface faces the workpiece, and wherein the first robot performs a function on the workpiece while the first robot is associated with the movement surface; wherein the workpiece is a wing of an aircraft.

19. The apparatus of claim 18, wherein the movement surface is on a base, and wherein the base and the workpiece are formed of a same material.

20. An apparatus comprising:
a workpiece;
a movement surface, in which the movement surface faces the workpiece;
a processor having surface data representing the movement surface;
a first robot associated with the movement surface and positioned between the movement surface and the workpiece; and
a first number of sensors associated with the first robot and facing the movement surface, in which the first number of sensors is configured to form sensor data as the first robot moves across the movement surface, wherein the sensor data represents a portion of the movement surface;
wherein a functional component is on an opposite side of the first robot from the first number of sensors on the first robot
wherein the functional component is an end effector; and
wherein the movement surface is movable to any angle relative to the ground and the workpiece.

21. The apparatus of claim 20, wherein the movement surface is on a base of a movement assembly; and wherein the movement surface comprises at least one of a pattern on the movement surface, a texture of the movement surface, a grain of the movement surface, an RFID on the movement surface, and an RFID embedded in the movement surface.

22. The method of claim 1, wherein the movement surface is movable to any angle relative to the ground.

23. The method of claim 1, wherein the movement surface is movable to any angle relative to the workpiece.

24. The method of claim 10, wherein the movement surface includes at least one of a pattern on the movement surface, a texture of the movement surface, a grain of the movement surface, an RFID on the movement surface, and an RFID embedded in the movement surface.

25. A method of a robot self-locating on a movement surface, the method comprising:
- moving a first robot across the movement surface and relative to a workpiece, in which the movement surface faces the workpiece;
- moving the movement surface relative to the workpiece;
- forming sensor data using a first number of sensors on the first robot as the first robot moves across the movement surface, in which the sensor data represents a portion of the movement surface;
- determining a location of the first robot on the movement surface using the sensor data; and
- determining a location of a functional component of the first robot relative to the workpiece using the location of the first robot on the movement surface;
- wherein the functional component comprises an end effector.

* * * * *